(12) United States Patent
Rombach

(10) Patent No.: US 12,083,770 B2
(45) Date of Patent: Sep. 10, 2024

(54) MULTI-LAYER WOOD COMPOSITE BLOCK, MULTI-LAYER WOOD VENEER, AND METHOD FOR THE PRODUCTION THEREOF

(71) Applicant: FRITZ KOHL GMBH & CO. KG, Karlstadt (DE)

(72) Inventor: Georg Rombach, Eussenheim (DE)

(73) Assignee: FRITZ KOHL GMBH & CO. KG, Karlstadt (DE)

( * ) Notice: Subject to any disclaimer, the term of this patent is extended or adjusted under 35 U.S.C. 154(b) by 0 days.

(21) Appl. No.: 17/418,173

(22) PCT Filed: Aug. 14, 2020

(86) PCT No.: PCT/EP2020/072880
§ 371 (c)(1),
(2) Date: Jun. 24, 2021

(87) PCT Pub. No.: WO2021/032626
PCT Pub. Date: Feb. 25, 2021

(65) Prior Publication Data
US 2022/0212450 A1 Jul. 7, 2022

(51) Int. Cl.
*B32B 21/04* (2006.01)
*B32B 7/12* (2006.01)
(Continued)

(52) U.S. Cl.
CPC .............. *B32B 21/042* (2013.01); *B32B 7/12* (2013.01); *B32B 9/025* (2013.01); *B32B 9/042* (2013.01);
(Continued)

(58) Field of Classification Search
CPC ....... B32B 21/042; B32B 21/08; B32B 21/14; B32B 7/12; B32B 9/025; B32B 21/02; B32B 21/06; B32B 21/10; B32B 2307/536
See application file for complete search history.

(56) References Cited

U.S. PATENT DOCUMENTS 3,977,449 A * 8/1976 Sadashige ............... B32B 15/10
156/256
8,197,732 B2 * 6/2012 Dagher ..................... E04C 2/16
264/109
(Continued)

FOREIGN PATENT DOCUMENTS

DE 4010648 A1 10/1991
DE 202009013059 U1 2/2010
(Continued)

OTHER PUBLICATIONS

Office Action for related PCT Patent Application No. PCT/EP2020/072880, dated Feb. 17, 2022, 6 pages.
(Continued)

*Primary Examiner* — Joanna Pleszczynska
(74) *Attorney, Agent, or Firm* — DITTHAVONG, STEINER & MLOTKOWSKI

(57) ABSTRACT

The present invention relates to a multi-layer wood composite block, a multi-layer wood veneer and methods for producing the same. Furthermore, the invention relates to the use of the multi-layer wood veneer as a decorative and/or trim element, in particular in a vehicle interior, and articles comprising the multi-layer wood veneer.

8 Claims, 3 Drawing Sheets

(51) Int. Cl.
  *B32B 9/02*    (2006.01)
  *B32B 9/04*    (2006.01)
  *B32B 19/04*   (2006.01)
  *B32B 21/02*   (2006.01)
  *B32B 21/06*   (2006.01)
  *B32B 21/08*   (2006.01)
  *B32B 21/10*   (2006.01)
  *B32B 21/14*   (2006.01)
  *B32B 37/12*   (2006.01)
  *B32B 38/00*   (2006.01)

(52) U.S. Cl.
  CPC .......... *B32B 19/042* (2013.01); *B32B 21/02* (2013.01); *B32B 21/06* (2013.01); *B32B 21/08* (2013.01); *B32B 21/10* (2013.01); *B32B 21/14* (2013.01); *B32B 37/12* (2013.01); *B32B 38/0004* (2013.01); *B32B 2307/402* (2013.01); *B32B 2307/536* (2013.01); *B32B 2307/732* (2013.01); *B32B 2605/003* (2013.01)

(56) References Cited

U.S. PATENT DOCUMENTS 9,957,420 B2    5/2018  Morgeneyer et al.
2018/0370070 A1* 12/2018 Stopfer ............... B27D 3/00

FOREIGN PATENT DOCUMENTS

| EP | 2310196 A1 | 4/2011 |
| JP | S5452714 A | 4/1979 |
| WO | 2021032626 A1 | 2/2021 |

OTHER PUBLICATIONS

International Search Report with English Translation and Written Opinion of the International Searching Authority for related International Application No. PCT/EP2020/072880, dated Dec. 3, 2020, 10 pages.

* cited by examiner

MULTI-LAYER WOOD COMPOSITE BLOCK, MULTI-LAYER WOOD VENEER, AND METHOD FOR THE PRODUCTION THEREOF

CROSS-REFERENCE TO RELATED APPLICATIONS

This application claims priority from PCT Application Serial No. PCT/EP2020/072880, entitled "MULTI-LAYER WOOD COMPOSITE BLOCK, MULTI-LAYER WOOD VENEER, AND METHOD FOR THE PRODUCTION THEREOF," filed on Aug. 14, 2020, which claims priority to German Patent Application No: 102019122037.8, filed on Aug. 16, 2019, the contents of each are hereby incorporated herein in their entirety by this reference.

The invention relates to a multi-layer wood composite block, a multi-layer wood veneer and methods for producing the same. Furthermore, the invention relates to the use of the multi-layer wood veneer as a decorative and/or trim element, in particular in a vehicle interior, and to articles comprising the multi-layer wood veneer.

Multi-layer wood veneers obtained from multi-layer wood composite blocks are known.

DE 60 2005 001 689 T2 concerns a method for producing a veneer. According to this method, wood blocks are sliced into veneer with a thickness of about 0.65 mm after extended heating and soaking. Suitable adhesives mentioned include moisture-curing, thermal polyurethane adhesives.

The method described in DE 1 086 425 B for the production of finished wood veneers can optionally include slicing or round peeling of a multi-layered, glued wood block into individual veneers.

In EP 2 310 196 B1, a multi-layer wood block, veneers obtainable therefrom and methods for their production are described.

DE 10 2017 113 764 B4 discloses a method for producing a wood veneer and a veneer block, as well as a method for producing a moulded part. The veneer blocks are produced using an adhesive and then sliced into veneers.

DE 10 2015 009 012 B3 discloses a method for producing a veneer, the method comprising cutting off veneer sheets by means of a veneer slicing machine.

For economic reasons, wood veneers are preferably produced using a slicing process. This method saves material and produces veneers with a thickness of between 0.3 and 4 mm. However, the wood or veneer blocks must be heated and watered over an extended period of time to prepare them for slicing. Since this pre-treatment is accompanied by changes in temperature and humidity, which leads to a deformation, in particular expansion, of the individual layers of wood present in the veneer block, the achievable precision of sliced veneers is limited. In addition, this type of pre-treatment only permits the bonding of different materials to a limited extent, or the bonding often does not have the desired properties. In particular, adhesives that are both suitable for bonding different materials, such as wood, metals, plastics, and have sufficient resistance to moisture and/or heat during soaking or steaming, are not yet commercially available. Furthermore, the pre-treatment may be noticeable through colour changes in the wood. Last but not least, sliced veneers as well as round-peeled veneers often show cracks in the veneer. In principle, veneers are only obtainable by means of a slicing process up to a certain hardness of the wood or wood (composite) block used; ironwood, in particular, i.e. various tropical woods, cannot be sliced into veneers, but can only be processed by sawing.

Multi-layer sawn veneers are also known from the prior art. The sawing of wood (composite) blocks into veneers represents the most original method. One disadvantage of sawing is the comparatively large loss of material, which depends, among other things, on the thickness of the saw blade used. Overall, sawing is considerably more time-consuming. However, sawn veneers retain their colours and are largely free of cracks, as they do not necessarily have to be soaked/steamed and then dried again, but can directly be sawn in a dry state. Sawn veneers can usually be produced with a thickness of 1 mm or more and are mainly used for high-quality and highly stressed workpieces, e.g. in furniture construction or for floor coverings.

The present invention is based on the task of providing a multi-layer wood composite block suitable as a starting material for the production of a high precision veneer having a veneer thickness in the range 0.2 to 4.0 mm. Another object of the invention is to provide a high-precision, multi-layer wood veneer which can be used for decorative and/or trimming elements.

The present tasked is solved by the wood composite block comprising:
a plurality of superimposed layers of wood, and
at least one adhesive layer,
wherein the at least one adhesive layer is disposed between successive layers of wood, and
wherein the at least one adhesive layer, in the cured state, has a hardness of at least 70 Shore A, determined according to DIN EN ISO 868, and/or a hardness of at least 20 Shore D, determined according to DIN EN ISO 868.

Advantageous embodiments and further improvements are indicated in the corresponding dependent claims.

The multi-layer wood composite block according to the invention can be processed by sawing or slicing, since the wood composite block has advantageous properties. Preferably, the multi-layer wood composite block according to the invention can be processed by sawing or slicing in the dry state, even more preferably by sawing in the dry state. If the cured adhesive layers of the wood composite block are too soft, sawing is no longer possible because the adhesive layers smear and/or the sawn veneers do not hold their shape. However, if the adhesive layers are too hard, sawing is no longer possible and/or the wear on the tools used is enormous. Specifically, the adhesive layers, in the cured state, have a hardness of at least 70 Shore A and/or a hardness of at least 20 Shore D, preferably at least 75 Shore A and/or at least 24 Shore D, more preferably at least 80 Shore A and/or at least 27 Shore D.

Preferably, the hardness of the adhesive layers, in the cured state, is less than or equal to 60 Shore D.

Preferably, the hardness of the adhesive layers, in the cured state, is less than or equal to 100 Shore A.

The hardness, Shore A and Shore D, is measured according to DIN EN ISO 868:2003-10.

In contrast to veneer production by means of slicing, sawing eliminates the need for pre-treatment of the wood composite blocks, i.e. temperature and/or humidity fluctuations are avoided so that deformation and/or discolouration of the blocks does not occur. Thus, sawn veneers can be produced with higher precision. Also, the type of wood composite structure and the production of veneers by sawing allows designs that were not possible with previously known methods.

In principle, all adhesives suitable for gluing wood are suitable for implementing the present invention. Since moisture fluctuations, or swelling and/or warping of the wood, should be avoided, water- and solvent-free adhesives are preferred.

Preferably, the at least one adhesive layer is produced with water- and solvent-free adhesives. Any residual amounts of water and/or solvent contained are non-removable residual amounts or, for example, amounts of water introduced by the humidity of the air.

The adhesive properties of the adhesives also play a role. The surface properties such as polarity and structure of different materials, i.e. in particular different woods and plastics, but also other materials that may be introduced as intermediate layers in the multi-layer wood composite block or in the multi-layer wood veneer, may differ significantly. A decisive criterion for the selection of suitable adhesives is therefore that the adhesives have sufficient adhesion to all materials used.

Suitable adhesives include polyurethanes (PUR), epoxy resins, silane-modified polymers or two-component adhesives such as PVAc copolymer with isocyanate. Hot-melt adhesives based on polyurethane prepolymers and epoxy resins are particularly suitable.

Particularly preferred are moisture-curing hot-melt adhesives based on polyurethane prepolymers, which have a processing temperature of 100-140° C., and/or which have a viscosity before curing of 5000 to 20000 mPas, preferably from 5000 to 16000 mPas, more preferably of 8000 to 16000 mPas at 130° C. (Brookfield DV-II+ Thermosel, spindle 29), and/or which have a density before curing of 1.0 to 1.5 g/cm$^3$, preferably of 1.0 to 1.3 g/cm$^3$, more preferably of 1.1 to 1.3 g/cm$^3$.

According to a preferred embodiment, the wood composite block comprises a plurality of adhesive layers. On the one hand, the presence of a plurality of adhesive layers opens up additional design options, since each adhesive layer always also forms a line element in the wood composite block. On the other hand, the influence of the properties of the adhesive—such as its hardness—on the machinability of the wood composite block increases with an increasing number of adhesive layers.

Where the wood composite block comprises a plurality of different layers, these may be arranged in different ways; specific arrangements of the individual layers contained in the wood composite block may be taken from the attached figures.

In principle, the adhesive layers serve as a bond between one layer of wood and another layer of wood.

According to a further preferred embodiment, the wood composite block has
 a) a total carbon emission (TVOC—Total Volatile Organic Compounds) of less than or equal to 50 µg carbon/g determined in accordance with VDA 277, and/or
 b) a content of volatile hydrocarbons (VOC—volatile organic compounds) of less than or equal to 100 mg/kg and semi-volatile hydrocarbons (FOG—Fogging, or SVOC—semi-volatile organic compounds) of less than or equal to 250 mg/kg determined in accordance with VDA 278, and/or
 (c) a formaldehyde emission value of less than or equal to 3 mg/kg determined in accordance with VDA 275.

The above emission values TVOC, VOC, FOG and the formaldehyde emission value of the wood composite block according to the invention may also be, independently of each other, equal to zero.

Experts distinguish volatile hydrocarbons (VOC—Volatile Organic Compounds) from Very Volatile Organic Compounds (VVOC) and Semi-volatile Organic Compounds (SVOC). The sum of the concentrations of all volatile hydrocarbons is the TVOC value (Total Volatile Organic Compounds).

The term VOC summarises volatile organic compounds that have a boiling point range of 50-100° C. to 250-260° C. FOG and/or SVOC are referred to as organic compounds that have a boiling point range of 240° C. to 400° C. and may form a precipitate (lubricating film).

A wood composite block that meets the above criteria with regard to the emission tests in accordance with VDA 275, 277 and/or 278 has a low toxicity. Such a wood composite block is therefore suitable for a wide variety of uses, especially indoors. For example, the wood composite block is suitable for the production of decorative parts and/or trim parts for a vehicle interior.

Preferably, wood composite block has
 a) a total carbon emission (TVOC—Total Volatile Organic Compounds) of less than or equal to 50 µg carbon/g determined in accordance with VDA 277, and
 b) a content of volatile hydrocarbons (VOC—volatile organic compounds) of less than or equal to 100 mg/kg and semi-volatile organic compounds (FOG—Fogging) of less than or equal to 250 mg/kg determined in accordance with VDA 278;
or
 a) a total carbon emission (TVOC, Total Volatile Organic Compounds) of less than or equal to 50 µg carbon/g determined in accordance with VDA 277, and
 c) a formaldehyde emission value of less than or equal to 3 mg/kg determined in accordance with VDA 275;
or
 b) a content of volatile hydrocarbons (VOC—volatile organic compounds) of less than or equal to 100 mg/kg and semi-volatile organic compounds (FOG—Fogging) of less than or equal to 250 mg/kg determined in accordance with VDA 278;
and
 c) a formaldehyde emission value of less than or equal to 3 mg/kg determined in accordance with VDA 275.

More preferably, the wood composite block according to the invention has
 a) a total carbon emission (TVOC—Total Volatile Organic Compounds) of less than or equal to 50 µg carbon/g determined in accordance with VDA 277, and
 b) a content of volatile hydrocarbons (VOC—volatile organic compounds) of less than or equal to 100 mg/kg and semi-volatile organic compounds (FOG—Fogging) of less than or equal to 250 mg/kg determined in accordance with VDA 278;
and
 c) a formaldehyde emission value of less than or equal to 3 mg/kg determined in accordance with VDA 275.

According to a further preferred embodiment, the at least one adhesive layer is colourable and/or temperature-resistant up to 180° C., preferably 190° C., more preferably 200° C. and even more preferably 220° C.

Colourable adhesive layers allow the suppression of the potential occurrence of yellowing and/or the prevention of partial or total light penetration. If adhesive layers are coloured using a black pigment, for example, potentially existing yellowing effects are no longer visible. Furthermore, colourable adhesive layers open up additional design options, since an adhesive layer always forms a line element in the wood composite block as well.

The temperature resistance of the adhesive layers prevents yellowing effects, since—even with stronger, natural fluctuations in the ambient temperature—no or only very small amounts of decomposition products are present in the adhesive layers. Here, however, temperature resistance does not only include the decomposition of the adhesive layers, but also their dimensional stability; this means that an adhesive layer that is temperature-resistant up to 180° C. neither softens (does not melt), nor does thermal decomposition of the adhesive layer occur. Adhesive coatings that are temperature-resistant up to 180° C. open up additional options in terms of machining methods.

Preferably, the at least one adhesive layer is colourable and temperature-resistant up to 180° C., preferably 190° C., more preferably 200° C. and even more preferably 220° C., so that potential impairment of the appearance by yellowing is prevented.

According to a further preferred embodiment, the wood composite block comprises at least one intermediate layer, wherein the at least one intermediate layer is arranged between two wood layers.

The use of intermediate layers opens up additional design options, as each intermediate layer always forms a line element in the wood composite block as well. Furthermore, the intermediate layers may have an influence on the processing properties of the wood composite block.

Preferably, the at least one intermediate layer consists of metal, textile, plastic, leather, fleece, stone, felt, pressed paper, solid surface material, medium density (wood) fibreboard (MDF), or combinations thereof.

A particularly suitable pressed paper is the one made by the company Richlite (USA).

Within the wood composite block according to the invention, the at least one intermediate layer may be arranged between two wood layers in such a way that the intermediate layer is bonded to a first wood layer by a first adhesive layer and to a second wood layer by a second adhesive layer, i.e. the intermediate layer is embedded in an adhesive layer bonding two wood layers together.

According to a preferred embodiment, the wood composite block according to the invention comprises a plurality of intermediate layers. Provided that the wood composite block comprises a plurality of intermediate layers, these may be arranged in different ways. For example, several intermediate layers may be arranged between a first and a second wood layer. Possible arrangement variants of the individual layers contained in the wood composite block are shown in the attached figures.

The thickness of a layer may be the same over the entire area of the layer. However, the thickness of a layer may also vary. For example, a layer may have a rectangular, wedge-shaped, round or curved cross-section. In principle, the shape and thickness of the individual layers are freely selectable, for example depending on the desired design.

This applies in the same way to the wood layers and the adhesive layers contained in the wood composite block, as well as to the—optional—intermediate layers.

The wood composite block has a wood moisture content of less than or equal to 20%, preferably less than or equal to 18%, more preferably less than or equal to 15%, even more preferably between 6 and 15%.

The wood moisture is measured by means of a commercially available measuring device (Gann Hydromette, H35-M20), which determines the wood moisture on the basis of the electrical resistance (DIN EN 13183-2:2002-07 with DIN EN 13183-2 Corrigendum 1: 2003-12).

Alternatively, the wood moisture can also be determined by means of kiln-drying (DIN EN 13183-1:2002-07 with DIN EN 13183-1 Corrigendum 1:2003-12).

Another aspect of the invention relates to a multi-layer wood veneer comprising:
 a plurality of superimposed layers of wood, and
  at least one adhesive layer,
   wherein the at least one adhesive layer is disposed between successive layers of wood, and
   wherein the at least one adhesive layer, in the cured state, has a hardness of at least 70 Shore A, determined according to DIN EN ISO 868, and/or a hardness of at least 20 Shore D, determined according to DIN EN ISO 868.

Preferably, the adhesive layers, in the cured state, have a hardness of at least 75 Shore A and/or at least 24 Shore D, more preferably at least 80 Shore A and/or at least 27 Shore D.

Preferably, the hardness of the adhesive layers, in the cured state, is less than or equal to 60 Shore D.

Preferably, the hardness of the adhesive layers, in the cured state, is less than or equal to 100 Shore A.

The hardness, Shore A and/or Shore D, is measured according to DIN EN ISO 868.

The technical effects correlating with the hardness of the adhesive layers—as described for the wood composite block according to the invention—are also valid with regard to the multi-layer wood veneer.

According to a preferred embodiment, the multi-layer wood veneer according to the invention has a thickness of between 0.2 and 4.0 mm, preferably between 0.3 and 1.5 mm, more preferably between 0.5 and 1.0 mm and even more preferably between 0.6 and 0.9 mm.

With veneer thicknesses in the range of less than or equal to 1.5 mm, the multi-layer wood veneers are still sufficiently flexible to be bent into shape, e.g. for applications as decorative and/or trim elements, especially for vehicle interiors. At the same time, the material consumption of veneers with a thickness of less than or equal to 1.5 mm is relatively low.

The wood veneer according to the invention is preferably produced with high precision, i.e. it has a thickness tolerance of less than or equal to 0.25 mm, preferably less than or equal to 0.20 mm and more preferably less than or equal to 0.15 mm.

According to a preferred embodiment, the wood veneer has a plurality of adhesive layers.

According to a preferred embodiment, the wood veneer has
 a) a total carbon emission (TVOC—Total Volatile Organic Compounds) of less than or equal to 50 μg carbon/g determined in accordance with VDA 277, and/or
 b) a content of volatile hydrocarbons (VOC—Volatile Organic Compounds) of less than or equal to 100 mg/kg and semi-volatile hydrocarbons (FOG—Fogging or SVOC—Semi-Volatile Organic Compounds) of less than or equal to 250 mg/kg determined in accordance with VDA 278, and/or
 c) a formaldehyde emission value of less than or equal to 3 mg/kg determined in accordance with VDA 275.

The above emission values TVOC, VOC, FOG and the formaldehyde emission value of the wood composite block according to the invention may also be, independently of each other, equal to zero.

Preferably, wood veneer has
  a) a total carbon emission (TVOC—Total Volatile Organic Compounds) of less than or equal to 50 μg carbon/g determined in accordance with VDA 277, and
  b) a content of volatile hydrocarbons (VOC—volatile organic compounds) of less than or equal to 100 mg/kg and semi-volatile hydrocarbons (FOG—Fogging) of less than or equal to 250 mg/kg determined in accordance with VDA 278;
or
  a) a total carbon emission (TVOC—Total Volatile Organic Compounds) of less than or equal to 50 μg carbon/g determined in accordance with VDA 277, and
  c) a formaldehyde emission value of less than or equal to 3 mg/kg determined in accordance with VDA 275;
or
  b) a content of volatile hydrocarbons (VOC—volatile organic compounds) of less than or equal to 100 mg/kg and semi-volatile hydrocarbons (FOG—Fogging) of less than or equal to 250 mg/kg determined in accordance with VDA 278;
  and
  c) a formaldehyde emission value of less than or equal to 3 mg/kg determined in accordance with VDA 275.

More preferably, the wood composite block according to the invention has
  a) a total carbon emission (TVOC—Total Volatile Organic Compounds) of less than or equal to 50 μg carbon/g determined in accordance with VDA 277, and
  b) a content of volatile hydrocarbons (VOC—volatile organic compounds) of less than or equal to 100 mg/kg and semi-volatile organic compounds (FOG—Fogging) of less than or equal to 250 mg/kg determined in accordance with VDA 278;
  and
  c) a formaldehyde emission value of less than or equal to 3 mg/kg determined in accordance with VDA 275.

According to a further preferred embodiment, the at least one adhesive layer is colourable and/or temperature-resistant up to 180° C., preferably 190° C., more preferably 200° C. and even more preferably 220° C., so that a the potential impairment of the appearance by yellowing is prevented.

According to a further preferred embodiment, the wood veneer comprises at least one intermediate layer, wherein the at least one intermediate layer is arranged between two wood layers.

Preferably, the at least one intermediate layer consists of metal, textile, plastic, leather, fleece, stone, felt, pressed paper, solid surface material, medium density (wood) fibreboard (MDF), or combinations thereof.

Suitable pressed paper are for example the products of the company richlite (USA).

According to a further preferred embodiment, the wood veneer according to the invention includes a plurality of intermediate layers.

Within the wood veneer according to the invention, the at least one intermediate layer may be arranged between two wood layers in such a way that the intermediate layer is bonded to a first wood layer by a first adhesive layer and to a second wood layer by a second adhesive layer, that is, the intermediate layer is embedded in an adhesive layer bonding two wood layers together.

Where the wood veneer comprises a plurality of intermediate layers, these may be arranged in different ways. For example, several intermediate layers may be arranged between a first and a second wood layer. Possible arrangement variants of the individual layers included in the wood veneer are shown in the attached figures.

The thickness of a layer may be the same over the entire area of the layer. However, the thickness of a layer may also vary. For example, a layer may have a rectangular, wedge-shaped, round or curved cross-section. In principle, the shape and thickness of the individual layers are freely selectable, for example depending on the desired design.

This applies both to the wood and to the adhesive layers contained in the wood composite block, as well as to the—optional—intermediate layers.

Preferably, the multi-layer wood veneer according to the invention is a sawn veneer.

The wood veneer has a wood moisture content of less than or equal to 20%, preferably less than or equal to 18%, more preferably less than or equal to 15%, even more preferably between 6 and 15%.

The wood moisture is measured by means of a commercially available measuring device (Gann Hydromette, H35-M20), which determines the wood moisture on the basis of the electrical resistance (DIN EN 13183-2:2002-07 with DIN EN 13183-2 Corrigendum 1: 2003-12).

Alternatively, the wood moisture can also be determined by means of kiln-drying (DIN EN 13183-1:2002-07 with DIN EN 13183-1 Corrigendum 1:2003-12).

The technical effects correlating with the above preferred embodiments—as described for the wood composite block according to the invention—are also valid with regard to the multi-layer wood veneer.

Another aspect of the invention relates to a method of producing a multi-layer wood composite block according to the invention as claimed in claims 1 to 6, comprising the steps of:
  a) Providing a plurality of dry wood layers;
  b) Dry gluing the dry wood layers together.

Because the wood layers are dry and dry-glued during the method for producing the multi-layer wood composite block according to the invention, deformation and/or discolouration of the wood layers caused by moisture can be avoided.

Preferably, cut to size dry wood layers and/or cut to size intermediate layers are calibrated before dry gluing and/or the cured wood composite block is calibrated after dry gluing.

Even more preferably, both the cut to size dry wood layers and the cut to size intermediate layers are calibrated before dry gluing and the cured wood composite block is calibrated after dry gluing.

The details given above on the wood composite block according to the invention also apply accordingly to the method for producing the multi-layer wood composite block.

According to a preferred embodiment, the individual wood layers are layered on top of or next to each other using a die, wherein the die is designed in such a way that it prevents the wood layers from slipping.

With the use of a die, slipping of the layers during gluing is prevented, so that the desired precision can be ensured.

A further aspect of the invention relates to a method of producing a multi-layer wood veneer, comprising cutting a multi-layer wood composite block according to the invention as claimed in any one of claims 1 to 6 to form multi-layer wood veneers.

According to a preferred embodiment, the wood composite block is sawn into multi-layer wood veneer.

Sawing veneers, unlike slicing, does not require any pre-treatment such as soaking and/or steaming of the wood composite block. Consequently, the wood composite block is not exposed to temperature and/or humidity fluctuations that could lead to a deformation and/or discolouration of the composite block or the individual veneer sheets. Due to the fact that thermal pre-treatment of the multi-layer wood composite block is not required, the choice of adhesives that can be used is less limited than with the conventional slicing process. Due to this extended selection, adhesives can also be used that have particularly advantageous adhesive properties with respect to different materials, i.e. not only for wood, but also for the materials used as intermediate layers. Thus, the method according to the invention offers more design options with regard to possible material combinations and, correspondingly, accessible designs.

In addition, sawing offers the advantage that cracking is avoided and a wider range of materials can be used in the production of the multi-layer veneers. Very hard materials such as ironwood, that is, various tropical woods, metals and hard plastics, can be sawn but not sliced.

The wood composite block is sawn in order to cut it into multi-layered wood veneers, wherein the sawing is preferably carried out with a band saw, for example a horizontal band saw.

According to an improved design, the cutting of the wood composite block is carried out at an angle of 0° to 180° to the cutting surfaces of the wood layers, in particular at an angle of between 45° and 135° to the cutting surfaces of the wood layers. Particularly preferably, the cutting of the wood composite block is carried out perpendicular to the cutting surface of the wood layers.

The wood composite block according to the invention preferably remains dry during the entire processing, i.e. no water-based or solvent-based adhesive is used, nor is the wood composite block watered or steamed.

In order to guarantee the precision of the finished multi-layer wood veneers, it is essential that attention is always paid to the range of the wood moisture content of the wood composite block or the individual components.

The wood composite block has a wood moisture content of less than or equal to 20%, preferably less than or equal to 18%, more preferably less than or equal to 15%, even more preferably between 6 and 15%.

The wood moisture is measured by means of a commercially available measuring device (Gann Hydromette, H35-M20), which determines the wood moisture on the basis of the electrical resistance (DIN EN 13183-2:2002-07 with DIN EN 13183-2 Corrigendum 1: 2003-12).

Alternatively, the wood moisture can also be determined by means of kiln-drying (DIN EN 13183-1:2002-07 with DIN EN 13183-1 Corrigendum 1:2003-12).

The multi-layer wood composite block is cut by sawing or slicing, preferably by sawing or slicing in a dry state, more preferably by sawing in a dry state, into multi-layer wood veneers having a thickness in the range of 0.2 and 4.0 mm, preferably between 0.3 and 1.5 mm, more preferably between 0.5 and 1.0 mm and even more preferably between 0.6 and 0.9 mm, wherein the thickness of the multi-layer wood veneer has a tolerance of less than or equal to 0.25 mm, preferably less than or equal to 0.20 mm and more preferably less than or equal to 0.15 mm.

The details given above on the wood veneer according to the invention also apply accordingly to the process for producing the multi-layer wood veneer.

The technical effects or advantages of such a wood veneer according to the invention are analogous to those described for the method and the preceding wood veneer.

Besides, the wood veneer according to the invention can be used as a decorative element and/or trim element in furniture construction, in interior fittings, in articles of daily use such as mobile phones and corresponding protective covers, but also in the field of textile and leather goods.

Preferably, the multi-layer wood veneer according to the invention is used as a decorative element and/or trim element in a vehicle interior.

Compared to the prior art, the use of a multi-layer wood veneer according to the invention, as described above, opens up new options. On the one hand, this is due to the fact that the veneers are significantly more flexible than conventional sawn veneers due to their thinness. On the other hand, the accessible designs can be reproduced with exceptional precision. In addition, the nature of the wood composite structure and the method of producing the veneers according to the invention, in particular the method of production by means of sawing in the dry state, allow the use of materials in designs and thicknesses which are not usable for veneer production by means of slicing. As a result, the present invention expands the design scope in veneer production and makes new designs accessible that are not producible with the previous technical means.

The advantages over the prior art are the same as those described in connection with the use of the wood veneer.

The invention is explained in more detail below with reference to the description of exemplary embodiments and with reference to the accompanying schematic drawings. Further advantages of the invention will be clear from the following description of preferred exemplary embodiments, which, however, are not to be understood as limiting in any way. All embodiments of the invention may be combined with each other within the scope of the invention.

FIG. 1 schematic representation of a multi-layer wood composite block according to the invention;

FIG. 2 schematic representation of a multi-layer wood veneer according to the invention;

FIGS. 3a-3d schematic representation of different layer arrangements in wood composite blocks or veneers according to the invention.

FIG. 1 shows a wood composite block according to the invention. The wood composite block shown comprises a plurality of wood layers (1), a plurality of adhesive layers (2) and an (optional) intermediate layer (3). Each of the layers (1), (2) and (3) has a thickness (d), wherein (d) can be chosen for each type of layer (1), (2) and (3), as well as for each individual layer (1a), (1b), (1c) independently of the thickness (d) of the other layers.

Only one adhesive layer (2) may be provided between two wood layers (1), by means of which the wood layers (1) are glued together. This adhesive layer (2) then forms a visible line element in the finished multi-layer wood veneer. Optionally, the adhesive layer (2) may be coloured to make further design alternatives accessible.

FIG. 2 schematically shows a wood veneer according to the invention. The wood veneer shown comprises a plurality of wood layers (1) having a thickness (d), a plurality of adhesive layers (2) having a thickness (d), and an (optional) intermediate layer (3) having a thickness (d), wherein the thickness (d) for each of the wood layers (1), adhesive layers (2) and intermediate layer(s) (3) may be selected independently from the plurality of layers.

The wood veneer has a thickness (s) in the range of 0.2 to 4.0 mm, preferably between 0.3 and 1.5 mm, more preferably between 0.5 and 1.0 mm and even more preferably between 0.6 and 0.9 mm; wherein the thickness of the multi-layer wood veneer has a tolerance of less than or equal to 0.25 mm, preferably less than or equal to 0.20 mm and more preferably less than or equal to 0.15 mm.

FIGS. 3a-3d schematically show various possible arrangements of the wood layers (1), adhesive layers (2) and intermediate layers (3) in wood composite blocks or veneers according to the invention.

Figure 1:
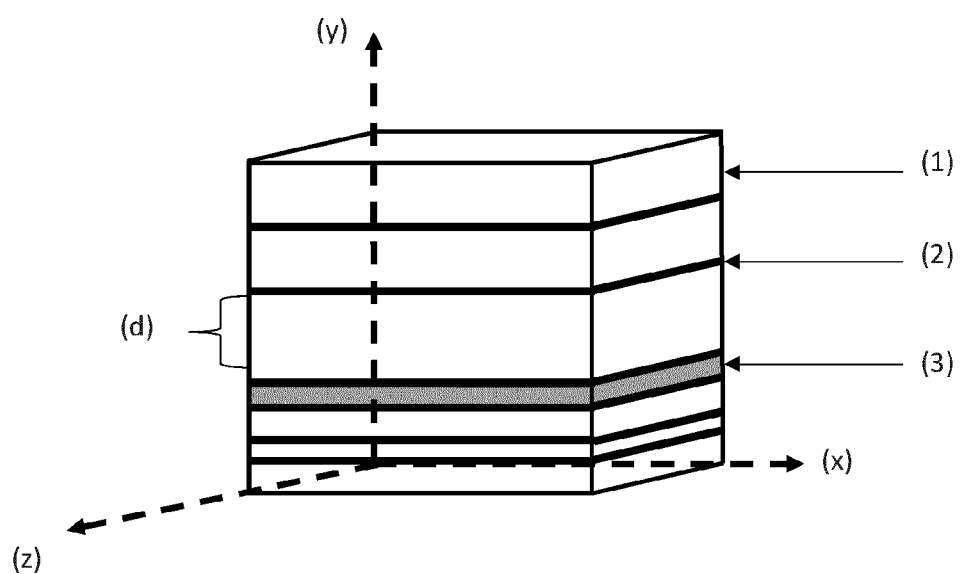
Figure 2:
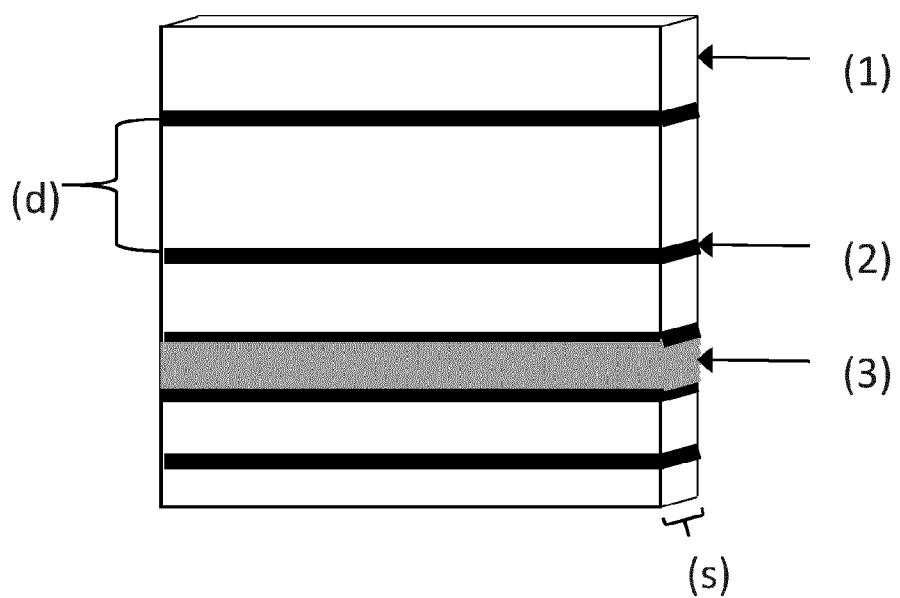
Figure 3A:
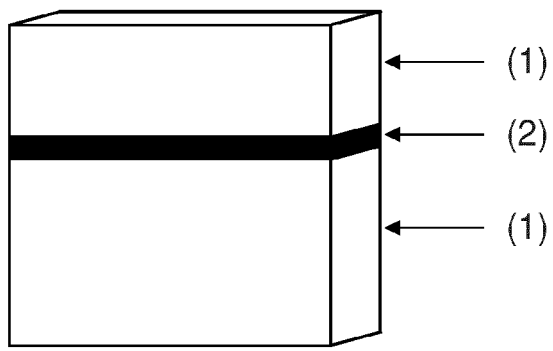
FIG. 3a shows the simplest variant according to the invention, comprising a plurality, in this case two, of superimposed wooden layers (1) and at least one adhesive layer (2), wherein the at least one adhesive layer (2) is arranged between successive wooden layers (1).
Figure 3B:
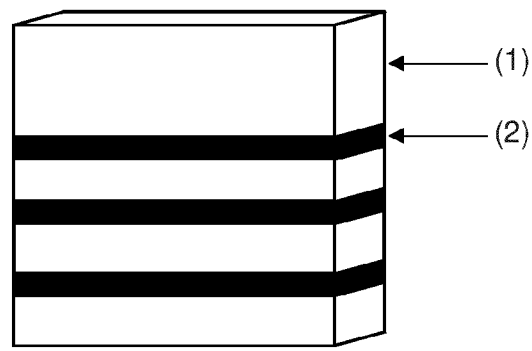
FIG. 3b shows a variant according to the invention, comprising a plurality of superimposed wood layers (1) and a plurality of adhesive layers (2), each of the adhesive layers (2) being arranged between two successive wood layers (1).
Figure 3C:
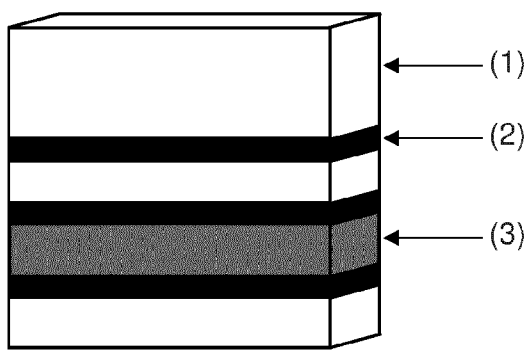

FIG. 3c shows a variant according to the invention, comprising a plurality of superimposed wood layers (1), a plurality of adhesive layers (2), and an intermediate layer (3) sandwiched between two wood layers (1) in such a way that it is connected to the wood layers (1) by means of two adhesive layers (2). In other words, the intermediate layer (3) is embedded in an adhesive layer (2) that bonds two wood layers (1) together. The intermediate layer (3) forms a line element in the multilayer wood veneer.

Figure 3D:
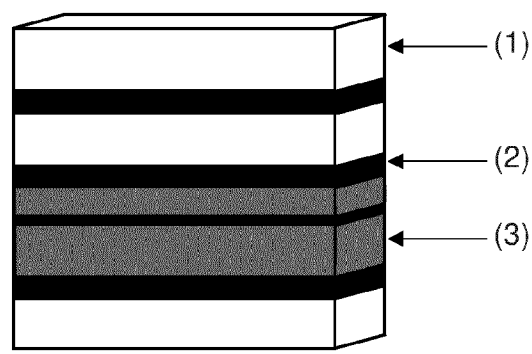

FIG. 3d shows a variant according to the invention, comprising a plurality of superimposed wood layers (1), a plurality of adhesive layers (2), and a plurality of intermediate layers (3). As shown in the figure, an intermediate layer (3) may be embedded in an adhesive layer (2) joining two wood layers (1). Alternatively, several intermediate layers (3) may be embedded in an adhesive layer (2) joining two wood layers (1) together. The number and thickness (d) of the layers (1), (2) and (3) in a wood composite block or veneer according to the invention are freely selectable.

LIST OF REFERENCE SIGNS 1 wood layer
2 adhesive layer
3 intermediate layer
d layer thickness
s thickness
x width
y height
z depth

The invention claimed is:

1. A multi-layer dry wood veneer, comprising:
a plurality of superimposed layers of dry wood, and
at least one adhesive layer,
wherein the at least one adhesive layer is disposed between successive layers of dry wood, and
wherein the at least one adhesive layer, in the cured state, has a hardness between 70 and 100 Shore A, determined in accordance with DIN EN ISO 868, and a hardness of between 20 and 60 Shore D, determined in accordance with DIN EN ISO 868;
wherein the multi-layer dry wood veneer has a total carbon emission (TVOC-Total Volatile Organic Compounds) of less than or equal to 50 µg carbon/g determined in accordance with VDA 277, and
wherein the dry wood veneer has a wood moisture content of less than or equal to 20%.

2. The multi-layer dry wood veneer according to claim 1, the dry wood veneer having:
(a) a content of volatile hydrocarbons (VOC) of less than or equal to 100 mg/kg and semi-volatile organic compounds (FOG) of less than or equal to 250 mg/kg determined in accordance with VDA 278; and/or
(b) a formaldehyde emission value of less than or equal to 3 mg/kg determined in accordance with VDA 275.

3. The multi-layer dry wood veneer according to claim 1, wherein the at least one adhesive layer is colourable; and/or
wherein the at least one adhesive layer is temperature resistant up to 180°C; and/or
wherein the dry wood veneer comprises at least one intermediate layer, and wherein the at least one intermediate layer is disposed between two dry wood layers.

4. The multi-layer dry wood veneer according to claim 3, wherein the at least one intermediate layer consists of metal, textile, plastic, leather, fleece, stone, felt, pressed paper, mineral material, medium density fibreboard (MDF) or combinations thereof.

5. A decorative and/or trim element comprising a multi-layer wood veneer according to claim 1, in a vehicle interior.

6. Article comprising a multi-layer wood veneer according to claim 1.

7. The multi-layer dry wood veneer according to claim 1, wherein
the multi-layer dry wood veneer having a thickness between 0.2 and 4.0 mm; and/or
wherein the dry wood veneer comprises a plurality of adhesive layers.

8. The multi-layer dry wood veneer according to claim 1, wherein an adhesive contained in the at least one adhesive layer is water- and solvent-free.

* * * * *